United States Patent
Natarajan et al.

(10) Patent No.: US 9,614,704 B2
(45) Date of Patent: Apr. 4, 2017

(54) METHODS AND APPARATUS TO PERFORM SERIAL COMMUNICATIONS

(71) Applicant: Texas Instruments Incorporated, Dallas, TX (US)

(72) Inventors: Venkatesh Natarajan, Karnataka (IN); Alexander Tessarolo, Lindfield (AU)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/083,549

(22) Filed: Mar. 29, 2016

(65) Prior Publication Data
US 2017/0033955 A1    Feb. 2, 2017

Related U.S. Application Data

(60) Provisional application No. 62/199,006, filed on Jul. 30, 2015.

(51) Int. Cl.
*H04L 25/49* (2006.01)
*H04L 1/00* (2006.01)
*H04L 5/00* (2006.01)

(52) U.S. Cl.
CPC .............. *H04L 25/49* (2013.01); *H04L 1/009* (2013.01); *H04L 1/0041* (2013.01); *H04L 1/0045* (2013.01); *H04L 1/0061* (2013.01); *H04L 1/0083* (2013.01); *H04L 1/0091* (2013.01); *H04L 5/0044* (2013.01)

(58) Field of Classification Search
CPC ... H04L 1/0072; H04L 1/0057; H04L 1/0061; H04L 1/0083; H04L 7/048; H04L 25/49; H04L 1/0041

USPC ......................................... 375/295, 316, 341
See application file for complete search history.

(56) References Cited

U.S. PATENT DOCUMENTS

| | | | | |
|---|---|---|---|---|
| 6,662,332 B1 * | 12/2003 | Kimmitt | ............ | H03M 13/276 714/701 |
| 6,738,935 B1 * | 5/2004 | Kimmitt | ............... | H04L 1/0045 370/464 |
| 7,177,325 B2 * | 2/2007 | Claseman | ............. | H04L 1/1607 370/469 |
| 7,301,928 B2 * | 11/2007 | Nakabayashi | ........ | H04L 1/0009 370/338 |
| 8,179,778 B2 * | 5/2012 | Kim | .................. | H03M 13/2957 370/204 |
| 8,711,888 B2 * | 4/2014 | Bar-Sade | .............. | H04L 1/0002 370/538 |
| 8,910,009 B1 * | 12/2014 | Tang | ..................... | H04L 1/0041 714/752 |

(Continued)

*Primary Examiner* — Emmanuel Bayard
(74) *Attorney, Agent, or Firm* — John R. Pessetto; Charles A. Brill; Frank D. Cimino

(57) ABSTRACT

Methods and apparatus to perform serial communications are disclosed. An example serial data transmitter includes: a clock signal generator to generate a digital clock signal; a clock signal controller to enable the clock signal generator; a line break signal generator to, in response to an expiration of a time period, trigger the transmission of a transmission line check frame; a data integrity check generator to generate error detection data corresponding to first data to be transmitted via the transmission port; a signal framer to: generate a first data frame having a preamble, second data, third data, the first data, the error detection data, and fourth data; and generate the transmission line check frame.

20 Claims, 7 Drawing Sheets

(56) References Cited

U.S. PATENT DOCUMENTS

| | | | |
|---|---|---|---|
| 9,414,260 B2* | 8/2016 | Arita | H04L 1/0061 |
| 9,455,905 B2* | 9/2016 | Thaler | H04L 45/30 |
| 2015/0280799 A1* | 10/2015 | Kwon | H04L 25/0204 |
| | | | 375/267 |

* cited by examiner

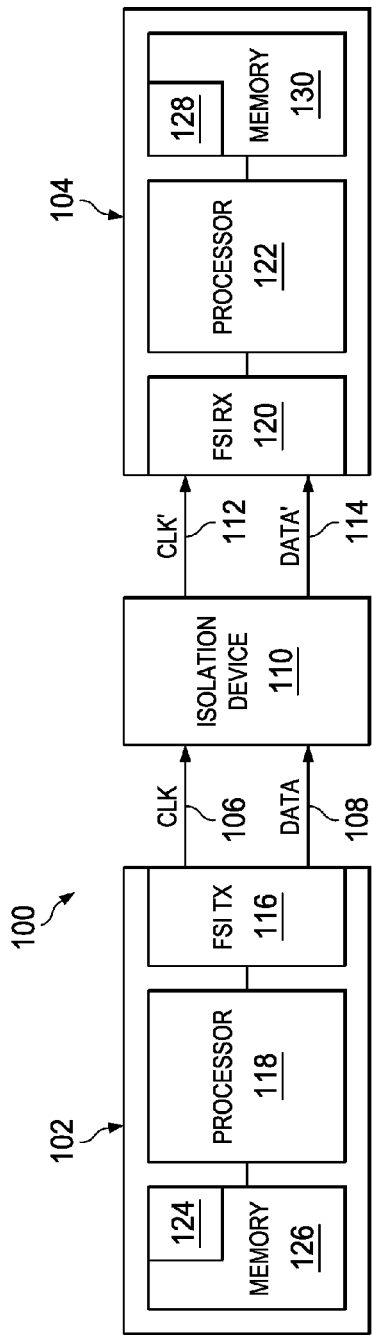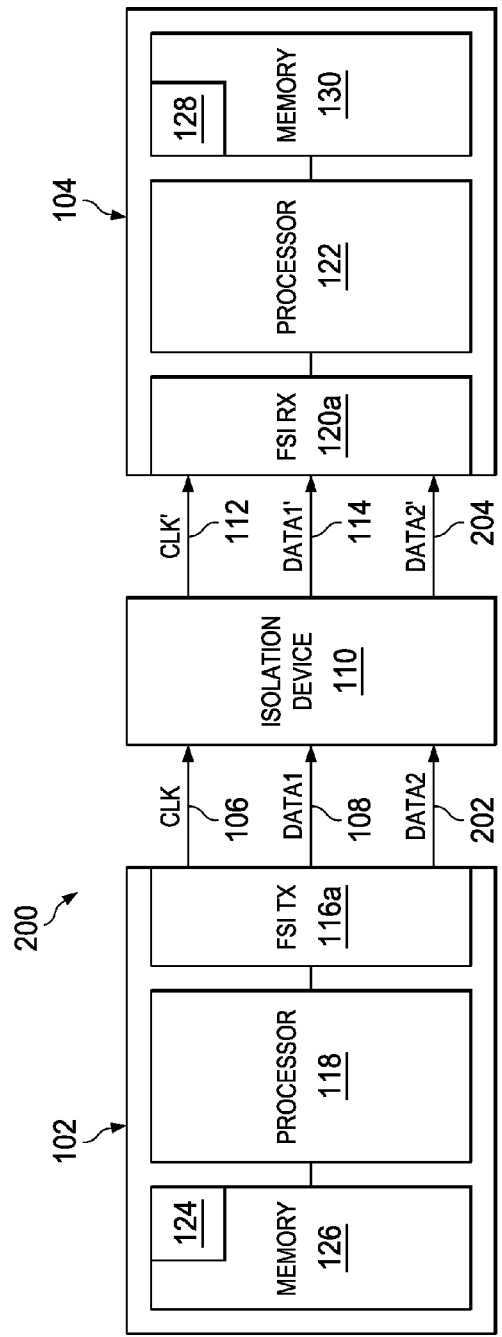

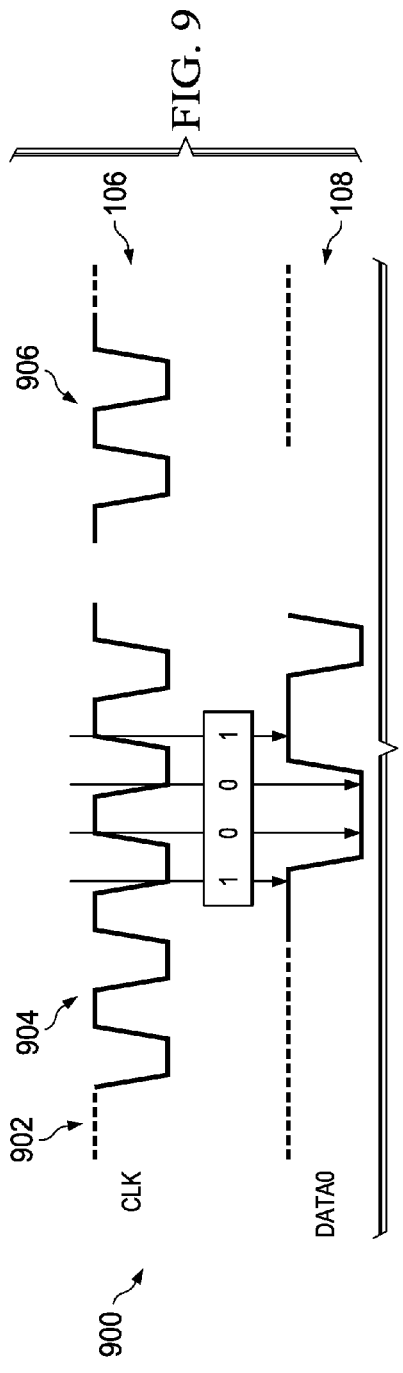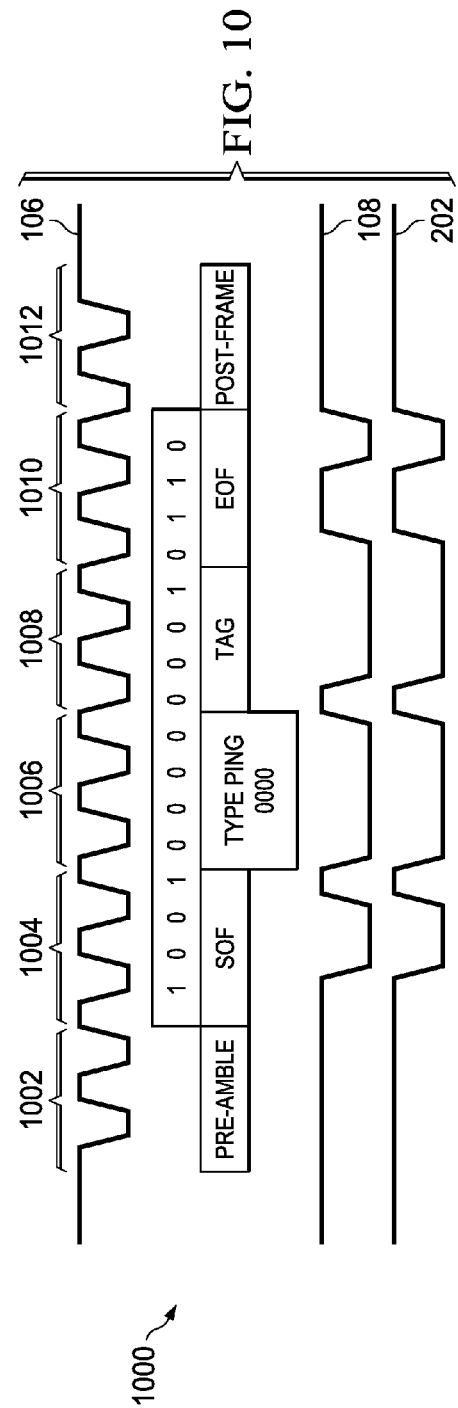

METHODS AND APPARATUS TO PERFORM SERIAL COMMUNICATIONS

RELATED APPLICATION

This patent claims the benefit of U.S. Provisional Application Ser. No. 62/199,006, which was filed on Jul. 30, 2015, entitled "PROTOCOL AND APPARATUS IN A DSP/MICROCONTROLLER FOR HIGH SPEED, LOW-LATENCY AND RELIABLE COMMUNICATION ACROSS GALVANIC ISOLATION DEVICES." U.S. Provisional Application Ser. No. 62/199,006 is hereby incorporated herein by reference in its entirety.

FIELD OF THE DISCLOSURE

This disclosure relates generally to serial communications, and, more particularly, to methods and apparatus to perform serial communications.

BACKGROUND

The Serial Peripheral Interface (SPI) is a conventional high speed synchronous serial input/output port that allows a serial bit stream of programmed length (2 to 16 bits) to be shifted into and out of devices at a programmed bit-transfer rate. The SPI is normally used for communication between a host device and external peripherals. Typical applications of SPI include interface(s) to external I/O or peripheral expansion via devices such as shift registers, display drivers, SPI Erasable Programmable Read-Only Memory (EPROMs) and analog-to-digital converters.

BRIEF DESCRIPTION OF THE DRAWINGS

FIG. 1 is a block diagram illustrating an example fast serial interface communications system to perform unidirectional serial communication between electrically isolated devices using a single unidirectional channel.

FIG. 2 is a block diagram illustrating an example fast serial interface communications system to perform unidirectional serial communication between electrically isolated devices using multiple unidirectional channels.

FIG. 9 is a signal diagram illustrating an example of operation of the fast serial interface of FIG. 1 transmitting user data via a single unidirectional port.

FIG. 10 is a signal diagram illustrating an example of operation of the fast serial interface of FIG. 2 transmitting a ping packet via multiple unidirectional ports.

The figures are not to scale. Wherever appropriate, the same reference numbers will be used throughout the drawing(s) and accompanying written description to refer to the same or like parts.

DETAILED DESCRIPTION

Figure 3:
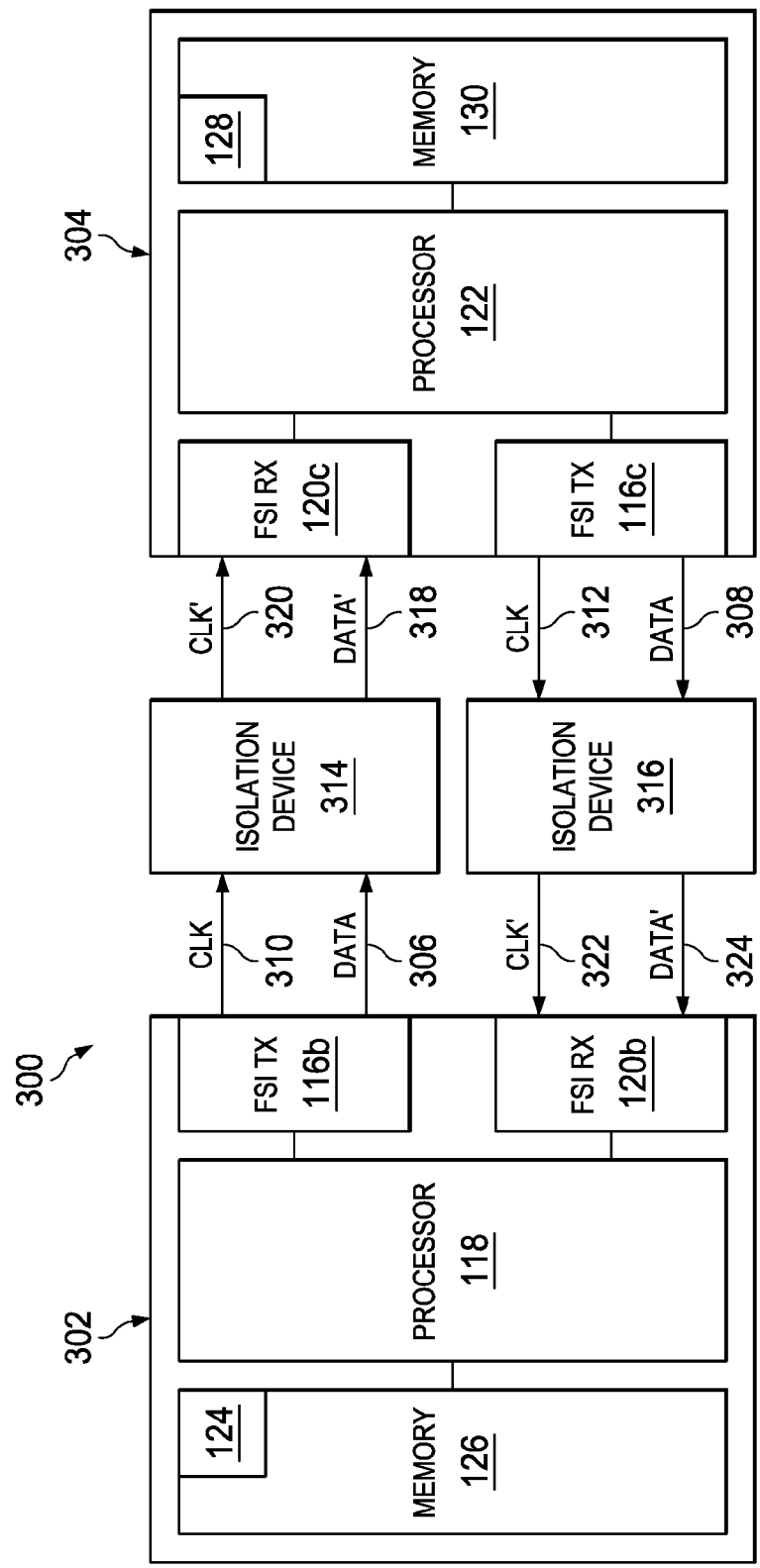
FIG. 3 is a block diagram illustrating an example fast serial interface communications system to perform bidirectional serial communications between electrically isolated devices using multiple unidirectional channels.

Galvanic isolation devices are used in circumstances in which two or more different electronic circuits that have no common power and ground connections are required to exchange signals (unidirectionally or bidirectionally). An isolation device facilitates communications between electrically isolated circuits. However, conventional isolation devices introduce relatively large signal delays and increase skew between multiple signals.

Conventional communications methods suffer from one or more of the following issues when used to transmit data across galvanic isolation devices: high latency; long delays between the start of transmission of data at the transmitter and completion of reception of data at the receiver; inability to handle large skews between the transmitter and the receiver at high speeds; low data transmission reliability; and/or inability to handle signal corruption and/or component failure. These problems make conventional communication methods unfit and/or expensive to implement in critical control systems that use electrical isolation.

Examples disclosed herein define a Fast Serial Interface (FSI) communications method. While not limited to such implementations or instances, disclosed examples that implement FSI provide reliable, high speed communications across isolation devices. Disclosed examples may be used with lower costs in control systems that utilize electrical isolation while maintaining low transmission latencies and high transmission speeds that may be required in high speed control systems.

Disclosed examples that implement FSI include one or more of the following characteristics: 1) source-synchronous double data rate transmission; 2) a skew adjustment block in the receive module to compensate for board and/or system delay mismatches; 3) cyclical redundancy check (CRC) bits (e.g., user-defined and/or default), data framing checks, and/or error correction codes; 4) communication line break frames to detect line breaks when communication is happening between two devices. In some examples, an FSI device may be packaged together with an SPI-compatible device to provide flexibility in implementation. Disclosed examples provide lower communication latencies and/or more reliable data transmission across isolation devices than conventional serial interfaces, such as SPI.

In some examples, the signaling characteristics of the FSI transmitter and/or the FSI receiver are defined to take into account the characteristics of isolation devices, to thereby enable fast and efficient communication across isolation devices.

Disclosed examples provide data transmission having all of the following characteristics, which are not available in combination in conventional serial communications devices such as, for example, beginning a transmission of a frame by a transmitter and completion of reception of the frame at a receiver with cyclic redundancy checks incorporated across a galvanic isolation device in a short amount of time (e.g., less than one microsecond, less than five microseconds, etc.) as seen by the system, and/or a data transmission bandwidth of at least 100 megabits per second (Mbps) when there is an isolator in the transmission path.

Disclosed examples further provide data transmission reliability by performing one or more data integrity checks on each frame transmission. Disclosed examples periodically check transmission line integrity by sending transmission line check frames. In examples disclosed herein, the ability to send and detect transmission line check frames is automatic and does not require CPU intervention. In some examples in which bidirectional communication is achieved between two devices, the transmission line integrity checks enable rapid identification and management of transmission line breaks and/or other problems.

Disclosed examples reduce power consumption by disabling clock and data signaling when frames are not being transmitted. With some conventional galvanic isolation devices that are usable with the disclosed examples, continued switching of the clock signal can consume tens of milliamps per channel.

FIG. 1 is a block diagram illustrating an example fast serial interface communications system 100 to perform serial communication between electrically isolated devices 102, 104 using a clock channel and a single unidirectional data channel. In examples disclosed herein, the clock channel is an interconnection (e.g., an electrical connection, an optical connection, a radio frequency connection, etc.) that carries a clock signal 106. For ease of explanation, in some examples, the clock channel is described in terms of the clock signal (e.g., the clock signal 106) that it carries. Likewise, in examples disclosed herein, the data channel is an interconnection (e.g., an electrical connection, an optical connection, a radio frequency connection, etc.) that carries a data signal 108. In some examples, the data channel is described in terms of the signal (e.g., the data signal 108) that the data channel carries. The example devices 102, 104 of FIG. 1 are electrically isolated (e.g., have no common power or ground references).

The clock signal 106 and the data signal 108 are output by the first device 102 to the second device 104 via one or more isolation device(s) 110, such as a galvanic isolator. The example isolation device 110 of FIG. 1 has a first input port to receive the clock signal 106 output by the first device 102 via the clock channel, and a second input port to receive the data signal 108 output by the first device 104 via the data channel. The isolation device 110 generates an output clock signal 112 to reproduce the input clock signal 106 (e.g., with some gain and/or latency relative to the clock signal 106), and generates an output data signal 114 to reproduce the input data signal 108 (e.g., with some gain and/or latency relative to the clock signal 106). In some cases, the isolation device 110 may introduce skew between the output clock signal 112 and the output data signal 114.

To generate the clock signal 106 and the data signal 108, the first device 102 includes a FSI transmitter 116. The FSI transmitter 116 receives data, commands, and/or configuration information from a processor 118 of the first device 102. An example implementation of the FSI transmitter 116 is described below with reference to FIG. 4.

To receive the clock signal 112 and the data signal 114, the second device 104 includes a FSI receiver 120. The FSI receiver 120 receives commands and/or configuration information from a processor 122, receives the clock signal 112 and the data signal 114 from the isolation device 110, and decodes data received via the clock signal 112 and the data signal 114 to provide the data to the processor 122. An example implementation of the FSI receiver 120 is described below with reference to FIG. 5.

The clock signal 106 and the data signal 108 are unidirectional in that the isolation device 110 transmits signals from the first device 102 to the second device 104, but not from the second device 104 to the first device 102.

The example processor 118 may provide data to be transmitted to the FSI transmitter 116 based on, for example, software instructions 124 stored on a memory 126 and executed by the processor 118. In some examples, the FSI transmitter 116 may retrieve the data to be transmitted from a specified memory address (i.e., utilizing Direct Memory access). Similarly, the example processor 122 may execute software instructions 128 stored on a memory 130 to process data received from the device 102 by the FSI receiver 120. In some examples, the FSI receiver 120 may store the received data to a memory address (i.e., utilizing Direct Memory Access).

The example FSI transmitter 116 is serial peripheral device or circuit that transmits data frames. Conversely, the example FSI receiver 120 is a serial peripheral device or circuit that receives data frames. The FSI transmitter 116 and the FSI receiver 120 are completely independent circuits, which may be used in combination to implement bidirectional communication between multiple devices as described below with reference to FIG. 3.

FIG. 2 is a block diagram illustrating an example FSI communications system 200 to perform serial communication between electrically isolated devices using multiple unidirectional channels. The example FSI communications system 200 includes the example device 102, including the example FSI transmitter 116a, the example processor 118, the example instructions 124, and the example memory 126. The example system 200 also includes the example device 104, including the example FSI receiver 120a, the example processor 122, the example instructions 128, and the example memory 130.

The example FSI transmitter 116 of FIG. 2 transmits the clock signal 106 via the clock channel. In addition to transmitting the first data signal 108 via a first data channel, the example FSI transmitter 116a of FIG. 2 also transmits a second data signal 202 via a second data channel. In examples disclosed herein, the second data channel is an interconnection (e.g., an electrical connection, an optical connection, a radio frequency connection, etc.) that carries a second data signal 106. The example isolation device(s) 110 include an additional input to receive the second data signal 202 via the second data channel and an additional output to output the second data signal 204 via a second output data channel to the FSI receiver 120a. In FIG. 2, the example FSI receiver 120a includes an additional input to receive the second data signal 204 via the second output data channel, in addition to receiving the first data signal via the first output data channel 114. In some examples, serial data is alternated between the data signals 108, 202. For example, a first data bit of a set of data is transmitted by the first data signal 108, a second data bit of the set of data is transmitted by the second data signal 202, a third bit of the set of data is transmitted by the first data signal 108, etc. However, any other serial data transmission configuration may be used.

FIG. 3 is a block diagram illustrating another example FSI communications system 300 to perform bidirectional serial communications between electrically isolated devices 302, 304 using multiple unidirectional data signals 306, 308. The data signals 306, 308 are transmitted via one or more interconnections (e.g., an electrical interconnection, an optical interconnection, a radio frequency interconnection, etc.) The first device 302 includes a first FSI transmitter 116b and a first FSI receiver 120b. The second device 304 includes a second FSI transmitter 116c and a second FSI receiver 120c. The example data signals 306, 308, and corresponding clock signals 310, 312, are transmitted via respective isolation devices 314, 316. The example isolation device 314 receives the first data signal 306 via the first data channel, and receives the first clock signal 310 via the first clock channel (e.g., from the first device 302), and transmits a corresponding data signal 318 via a first output data channel, and outputs a corresponding clock signal 320 via a first output clock signal to the second device 304. Similarly, the example isolation device 316 receives, from the second device 304, the second data signal 308 via a second data channel and receives the second clock signal 312 via a second clock channel from the second device 304, and transmits a corresponding data signal 322 via a second output data channel and outputs a corresponding clock signal 324 via a second output clock channel to the first device 302.

The example first device 302 includes the processor 118, which may transmit data to the second device 304 via the first FSI transmitter 116b and receive data from the second device 304 via the first FSI receiver 120b. The example processor 118 may generate data for transmission and/or process data from the second device 304 by executing the instructions 124 stored in the memory 126. Similarly, the example second device 304 includes the processor 122, which may transmit data to the first device 302 via the second FSI transmitter 116b and receive data from the first device 302 via the second FSI receiver 120c. The example processor 122 may generate data for transmission and/or process data from the second device 302 by executing the instructions 128 stored in the memory 130. In this manner, the example devices 302, 304 may accomplish bidirectional communication across the isolation devices 314, 316.

Figure 4:
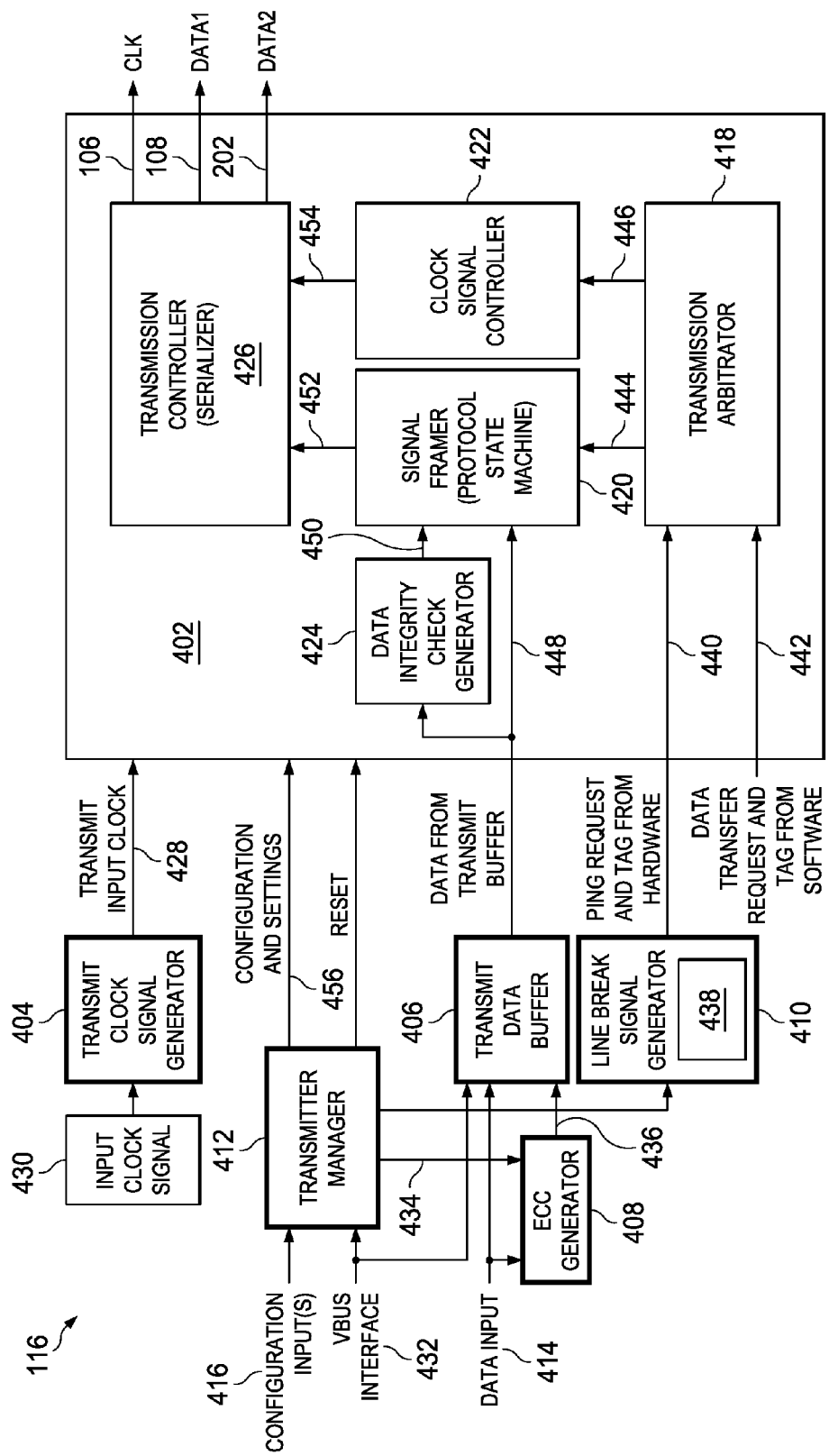
FIG. 4 is an example implementation of the fast serial interface transmitter(s) of any of FIGS. 1, 2, and/or 3.

FIG. 4 is an example implementation of the FSI transmitter(s) 116 of any of FIGS. 1, 2, and/or 3. The example FSI transmitter 116 of FIG. 4 includes a transmitter core 402, a transmit clock signal generator 404, a transmit data buffer 406, an error correction code (ECC) generator 408, a line break signal generator 410, and a transmitter manager 412. The example FSI transmitter 116 receives a data input 414 (e.g., from a processor executing instructions or setup to directly obtain data from memory) and/or configuration input(s) 416 (e.g., from a processor executing instructions, based on one or more configuration registers, etc.). The example FSI transmitter 116 of FIG. 4 outputs the example clock signal 106 and the example first data signal 108 of FIGS. 1 and/or 2. In some examples, the FSI transmitter 116 of FIG. 4 is further configured (e.g., based on the configuration input(s) 416) to output example clock signal 106, the example first data signal 108, and/or the example second data signal 202.

The example transmitter core 402 performs transmission framing, data integrity check generation, and signal level operations of the clock and data channels. In the example of FIG. 4, the transmitter core 402 includes a transmission arbitrator 418, a signal framer 420, a clock signal controller 422, a data integrity check generator 424, and a transmission controller 426.

The example transmit clock signal generator 404 is connected to the transmitter core 402 via a connection (e.g., an electrical connection, an optical connection, etc.) The example transmit clock signal generator 404 generates a transmit input clock signal 428 based on an input clock signal 430, which is transmitted to the transmitter core 402 via the connection. For example, the transmit clock signal generator 404 may include configurable divider to divide the input clock signal 430 to generate the actual frequency of the transmitter clock signal 106. The example transmit clock signal generator 404 enables the transmitter core 402 to function at a rate completely asynchronous to a system clock (e.g., a clock used by a processor, the example transmit data buffer 406, the example error correction code generator 408, the example line break signal generator 410, and/or the example transmitter manager 412) at a frequency that can be selected based on any external communication constraints determined by a circuit board, the isolation device(s) to which the signals 106, 108, 202 are output, and/or any other factors. While the transmit input clock signal 428 may run asynchronously with the system clock, in the example of FIG. 4 the frequency of the transmit input clock signal 428 is constrained to be less than or equal to the frequency of the system clock.

The example transmit data buffer 406 is a memory-mapped buffer that stores data to be transmitted via the transmitter core 402. The example transmit data buffer 406 receives the data input 414 as an input and outputs the data in response to a transmission command or other trigger. The example transmit data buffer 406 may be accessed via a VBUS interface 432 (e.g., a single VBUS interface), such as to provide the data input 414 and/or the data output command to the transmit data buffer 406. In examples disclosed herein, the VBUS interface refers to an internal peripheral access bus protocol.

The example ECC generator 408 receives the data input 414 and an ECC configuration signal 434. When the ECC configuration signal 434 indicates that ECC is enabled and/or specifies a particular mode of error correction code calculation, the example ECC generator 408 generates an error correction code 436 based on the data input 414. In some examples, the example signal framer 420 includes the error correction code 436 in a user data field of a frame. In some examples, the error correction code 436 is included in a data integrity check calculation (e.g., a cyclical redundancy check (CRC) field) by the data integrity check generator 424.

The example transmitter manager 412 controls and/or configures the example transmitter core 402. For example, the transmitter manager 412 may control the operation of the transmitter core 402 via a set of programmable registers referenced by the transmitter core 402. In some examples, the programmable registers of the transmitter manager 412 are accessed via the VBUS interface 432. The example VBUS interface 432 which may be accessed by a processor (e.g., the processor 118 of FIGS. 1, 2, and/or 3) and/or any other system that desires to transmit data, configure the transmitter, and/or trigger transmission of data. The example VBUS interface 432 can be made accessible to different master components via arbitration between the master components.

The example line break signal generator 410 triggers the transmission of a transmission line check frame via the transmitter core 402 in response to an expiration of a line break time period. The example transmission line check frame is also referred to herein as a "PING" frame or packet. By periodically transmitting a PING packet, the example line break signal generator 410 can indicate to an FSI receiver (e.g., the receiver 120 of FIGS. 1, 2, and/or 3) that the communication link from the FSI transmitter 116 is alive and functioning. In some examples, the line break signal generator 410 includes a dedicated line break counter 438. The dedicated line break counter 438 counts to a selected value. When the selected value is reached, the example line break signal generator 410 sends a PING request 440 to the transmitter core 402. The example PING request 440 triggers the transmitter core 402 to transmit a PING frame as described in more detail below. In some examples, the PING request includes tag information specified by the line break signal generator 410 and/or the transmitter manager 412. In some examples, the line break signal generator 410 operates independently of software executed by the processor 118.

In some examples, in the case of a simultaneous request for a data transmission (e.g., from the transmit data buffer 406) and a PING frame (e.g., from the line break signal generator 410), the transmitter core 402 arbitrates the simultaneous requests such that the data transmission is completed first and the periodic PING packet is transmitted after the data transmission.

The example transmission arbitrator 418 of FIG. 4 receives the PING request 440 from the line break signal generator 410 and/or receives a data transfer request 442. The data transfer request 442 may be received from, for example, a processor executing software and/or from any other circuit or interface that is configured to trigger data transmissions. In some examples, the data transfer request 442 is received via the VBUS interface 432. In some other examples, the data transfer request 442 is received via a register or direct memory access corresponding to the transmission arbitrator 418.

When the transmission arbitrator 418 receives the PING request 440 and/or the data transfer request 442, the example transmission arbitrator 418 determine which of a PING frame and/or a data frame is to be transmitted. For example, when both of the requests 440, 442 are received substantially simultaneously (e.g., before one of the requests can be acted on by the transmission arbitrator 418), the transmission arbitrator 418 may determine which of the PING frame or the data frame has priority.

When one of the PING frame or the data frame is to be output by the transmitter core 402 based on the request(s) 440, 442, the example transmission arbitrator 418 sends a frame command 444 to the signal framer 420 and sends a clock signal control command 446 to the clock signal controller 422. The example frame command 444 includes the type of frame to be transmitted (e.g., a data frame, a PING frame, an ERROR frame, etc.) and an instruction to generate the corresponding frame.

The example signal framer 420 of FIG. 4 receives the frame command 444 as an input. If the frame command 444 indicates that a data frame is to be generated, the example signal framer 420 further receives and/or accesses a data signal 448 from the transmit data buffer 406. If the frame command 444 indicates that a PING frame or an ERROR frame is to be generated, the example signal framer 420 may construct the PING frame or ERROR frame based on a designated frame structure and content for the corresponding frame type. Example frame structures and contents are described below.

The example clock signal controller 422 of FIG. 4 receives the clock signal control command 446 as an input. In the example FSI transmitter 116, the clock signal 106 and the data signal(s) 108, 202 are switched only during transmission of frames, and are controlled to remain at a constant value at all other times (e.g., at logical high). By holding the clock signal 106 and the data signal(s) 108, 202 at a constant value when frames are not being transmitted, the example FSI transmitter 116 conserves considerable power that would otherwise be consumed by the isolator device(s) 110.

The example data integrity check generator 424 of FIG. 4 receives the data signal 448 from the transmit data buffer 406 and generates data integrity check data 450 that is output to the signal framer 420. In some examples, the data integrity check generator 424 performs a cyclic redundancy check (CRC) calculation on the data signal 448 to determine one or more CRC bits for inclusion in a data frame generated by the signal framer 420.

In the example of FIG. 4, the data integrity check generator 424 calculates the CRC bits based only on the data from the transmit buffer 406 and on any further user-defined data bits. In some examples, the data integrity check generator 424 uses the polynomial 0x07 (e.g., $(x^8+x^2+x^1+x^0)$) to calculate the CRC. In some other examples, the CRC polynomial may be configured via the transmitter manager 412.

An example order in which the bytes of the data field and/or the user data field are assigned for CRC computation for the example data integrity check generator 424 is shown below in Table 1.

TABLE 1

| Example Assignment of Data to CRC Bits | | | |
|---|---|---|---|
| D15 . . . D0 | D15 . . . D0 | D15 . . . D0 | U7 . . . U0 |
| Byte 12 Byte 11 | Byte 10 Byte 9 | Byte 2 Byte 1 | Byte 0 |
| Data word 6 | Data word 5 | . . . . . . Data word 0 | User Data |

For example, for a 2-word data packet consisting of 2 words, Word 1=0x4433 and Word 0=0x2211 with a User-data of 0xaa, the CRC would be computed with the bytes being selected in the following order (first to last): 0xaa—Byte 0—user data field; 0x11—Byte 1—Data word 0, least significant byte; 0x22—Byte 2—Data word 0, most significant byte; 0x33—Byte 3—Data word 1, least significant byte; and 0x44—Byte 4—Data word 1, most significant byte. While in examples disclosed herein Byte 0 is transmitted first, any other order for transmitting the bytes of the data field and/or the user data field may additionally or alternatively be used.

The example signal framer 420 includes the data integrity check data 450 in the generated data frame and outputs the resulting frame 452 (e.g., a data frame, a PING frame, an ERROR frame, etc.) to the transmission controller 426. The example clock signal controller 422 outputs a clock enable signal 454 to the transmission controller 426. In the example of FIG. 4, the clock enable signal 454 and the resulting frame 452 are coordinated (e.g., latched in to the transmission controller 426) based on the transmit input clock 428 based on the frame and clock structure described below.

The example transmission controller 426 of FIG. 4 receives the resulting frame 452 and the clock enable signal 454 as inputs, serializes the data in the frame 452, and outputs the clock signal and one or more of the data signals (e.g., via the clock channel 106, the first data channel 108, the second data channel 202, etc.) to transmit the frame. As mentioned above, the transmission controller 426 is a unidirectional transmitter and does not receive signals via the ports for the clock signal 106 or the data signals 108, 202. In the example of FIG. 4, the transmission controller 426 is configured to transmit data via double data rate (DDR) signaling, in which data is transmitted and received on both the rising edge and the falling edge of the clock signal 106. Example signal diagrams are described below with reference to FIGS. 9-10.

In the example of FIG. 4, the clock signal 106 is a digital signal that is driven high (e.g., to a voltage representing a logical one) when the transmitter core 402 is reset and/or when there is no active transmission by the transmitter core 402. In the example of FIG. 4, four preamble clock edges are transmitted via the clock signal 106 before the start of every data frame transmitted via the data signal 108 and four clock edges are transmitted via the clock signal 106 after the last bit of a frame is completed. Data is transmitted on both edges of the clock signal.

In the example of FIG. 4, the first data signal 108 is the primary data output line for transmission. The first data signal 108 is normally driven high (e.g., to a voltage representing a logical one) when the transmitter core 402 is reset and/or when there is no active transmission. Although multi-lane data transmission is possible via the transmitter core 402, in the example of FIG. 4 all data frame related information like packet type, Start-of-Frame, Tag, and End-of-frame information is duplicated. Only the USER_DATA, CRC and DATA bits are split across the multiple lines. When the example transmitter core 402 is configured for multi-lane transmission (e.g., via a configuration signal 456, the first data signal 108 will transmit the even numbered bits of the data (e.g., the user data or software data provided via the data input 414) and CRC data. In the example of FIG. 4, data is transmitted via the first data signal 108 starting with the most significant bit of each frame field being sent first.

In the example of FIG. 4, the second data signal 202 is transmitted via the second data channel. The second data signal 202 is used only if the transmitter core 402 is configured for multi-lane transmission (e.g., via the configuration signal 456). The second data signal 202 is normally driven high when the module is reset and/or when there is no active transmission. During data transmission, data words are split between the first data signal 108 and the second data signal 202. The second data signal 202 includes the odd numbered bits of the data and CRC data. In the example of FIG. 4, the second data signal 202 only transmits data words and the CRC bytes, and replicates other data frame related information, such as packet type, Start-of-Frame, Tag, and/or End-of-Frame. In the example of FIG. 4, data is transmitted via the first data signal 108 starting with the most significant bit of each frame field being sent first.

The example FSI transmitter 116 transmits information in frames, which are constructed by the signal framer 420 based on the type of data to be transmitted. The shortest example frame is 16 bits long (without counting the preamble and post amble clock edges). The longest example frame is 288 bits long (e.g., a 16-word data packet). The term frame and packet are used interchangeably and both refer to the same. As used herein, the term "data word" or "word" refers to 16 bits, or four hexadecimal characters (e.g., 0x12ab).

As mentioned above, the example transmitter core 402 transmits 4 preamble clock edges of the clock signal 106 before the start of a frame and continues transmitting for four clock edges after the frame data is complete. The first data signal 108 and/or the second data signal 202 transmit data on both edges of the clock signal 106. An example basic frame structure is shown below in Table 2. Each field of the example frame in Table 2 below (e.g., the Start-of-Frame field, the frame type field, etc.) is be transmitted with the Most Significant Bit transmitted first.

TABLE 2

Example Frame Structure

| IDLE state | Preamble | Start of Frame | Frame Type | User Data field | Optional Data words |
|---|---|---|---|---|---|
| | 4 clock edges | 4 bits 1001 | 4 bits | 8 bits | 1-16 words |
| CRC byte (only for data frames) | Frame Tag | End of Frame | Post frame clock edges | IDLE | |
| 8 bits | 4 bits | 4 bits 0110 | 4 clock edges | | |

The example IDLE state in Table 2 refers to the clock signal 106 and the data signal(s) 106, 202 being held in a high (or low) logical state because data is not being transmitted. In examples in which a second frame is transmitted before or after a frame, the IDLE states before or after the frame of Table 2 may be omitted.

Table 3 below illustrates example frame type fields that correspond to different frame types. Example frame types in Table 3 include PING frames (e.g., initiated by the line break signal generator 410), ERROR frames (e.g., initiated by the transmitter manager 412 based on a software or hardware error communicated via the VBUS interface 432, or any other source of error), and/or data frames. In the example of FIG. 4, the frame type field may indicate a length of the data transmitted in the data frame, as shown below in Table 3.

TABLE 3

Example Frame Type Field Values and Descriptions

| Packet/ Frame Type | 4-bit code | Description |
|---|---|---|
| PING | 0000 | This is the PING packet which can be sent either by software or automatically by hardware. |
| ERROR | 1111 | This should be used typically during error conditions or any condition where one side wants to signal the other side for attention. However, the user software is at liberty to use this for any purpose. |
| DATA_1_WORD | 0100 | A 1-word data packet (16 bits of data) |
| DATA_2_WORD | 0101 | A 2-word data packet (32 bits of data) |
| DATA_4_WORD | 0110 | A 4-word data packet (64 bits of data) |
| DATA_6_WORD | 0111 | A 6-word data packet (96 bits of data) |
| DATA_N_WORD | 0011 | A N (1-16) word data packet where software has programmed the number of the data words in a designated register. Both transmitter and receiver modules should have the same value programmed. |
| Reserved/ Not used | 0001, 0010 and 1000 through 1110 | |

The different example frame types in Table 3 are explained in detail below.

PING frame: The purpose of the PING frame is to periodically send a signal or other indication to the receiver to validate the connectivity between the FSI transmitter 116 and the FSI receiver 120. The line break counter 438 is a timer that can be configured to periodically trigger the PING frame. Additionally or alternatively, the PING frame may be triggered by software (e.g., via the VBUS interface 432)

and/or by an external trigger input. In some examples, the PING frame may be setup to be periodically transmitted without software intervention. An example structure and content of a PING frame is illustrated in Table 4 below. The example PING frame does not include the user data field, the data words field, or the CRC field.

TABLE 4

Example PING frame

| IDLE state | Preamble | Start of Frame | Frame Type | Frame Tag | End of Frame | Post frame clock edges | IDLE state |
|---|---|---|---|---|---|---|---|
| | 4 clock edges | 1001 | 0000 | 4 bits | 0110 | 4 clock edges | |

The 4 bits of the frame tag field are user defined (e.g., set by configuration and/or software). In some examples, the FSI transmitter 116 includes separate registers for line break signal generator 410-generated ping frames and software-initiated ping frames.

ERROR frame: The main purpose of the ERROR frame is to send a short packet to signal some error or some form of alert from the FSI transmitter 116 to the FSI receiver 120. The example ERROR frame is initiated by software (e.g., from a processor executing software). Although the name of the frame is "ERROR", there is no restriction that this be used only for error situations. Instead, the example ERROR frame can be used for any form of software initiated signaling between the FSI transmitter 116 to the FSI receiver 120. Table 5 below illustrates an example structure of an ERROR frame. The 4 bits of the frame tag field are user defined (e.g., set by configuration and/or software).

TABLE 5

Example ERROR frame

| IDLE state | Preamble | Start of Frame | Frame Type | Frame Tag | End of Frame | Post frame clock edges | IDLE |
|---|---|---|---|---|---|---|---|
| | 4 clock edges | 1001 | 1111 | 4 bits | 0110 | 4 clock edges | |

DATA frame: Data frames are used to transmit data, such as user data, software-generated data, and/or other dynamically generated data to be transmitted from a transmitting device to a receiving device. In the example of FIG. 4, there are 4 fixed length data frame types and one user-defined data length frame type. In the user-defined data length frame type, the number of data words in the frame are configured (e.g., by software). In some examples, using the user-defined data length frame type requires the same data word length to be fixed in both the FSI transmitter 116 and the FSI receiver 120. The 4 bits of the frame tag field are user defined (e.g., set by configuration and/or software). Table 6 below illustrates an example 1-word (e.g., 16 bits) data frame.

TABLE 6

Example 1-Word DATA Frame

| IDLE state | Preamble | Start of Frame | Frame Type | User defined data | Data words |
|---|---|---|---|---|---|
| | 4 clock edges | 1001 | 0100 | 8 bits | 16 bits |
| CRC byte (only for data frames) | Frame Tag | End of Frame | Post frame clock edges | IDLE | |
| 8 bits | 4 bits | 0110 | 4 clock edges | | |

Table 7 below illustrates an example 2-word (e.g., 32 bits) DATA frame.

TABLE 7

Example 2-Word DATA Frame

| IDLE state | Preamble | Start of Frame | Frame Type | User defined data | Data words |
|---|---|---|---|---|---|
| | 4 clock edges | 1001 | 0101 | 8 bits | 32 bits - Word 0 transmitted first |
| CRC byte (only for data frames) | Frame Tag | End of Frame | Post frame clock edges | IDLE | |
| 8 bits | 4 bits | 0110 | 4 clock edges | | |

Table 8 below illustrates an example 4-word (e.g., 64 bits) DATA frame.

TABLE 8

Example 4-Word DATA Frame

| IDLE state | Preamble | Start of Frame | Frame Type | User defined data | Data words |
|---|---|---|---|---|---|
| | 4 clock edges | 1001 | 0110 | 8 bits | 64 bits - Word 0 transmitted first |
| CRC byte (only for data frames) | Frame Tag | End of Frame | Post frame clock edges | IDLE | |
| 8 bits | 4 bits | 0110 | 4 clock edges | | |

Table 9 below illustrates an example 6-word (e.g., 96 bits) DATA frame.

TABLE 9

Example 6-Word DATA Frame

| IDLE state | Preamble | Start of Frame | Frame Type | User defined data | Data words |
|---|---|---|---|---|---|
| | 4 clock edges | 1001 | 0111 | 8 bits | 96 bits - Word 0 transmitted first |

TABLE 9-continued

Example 6-Word DATA Frame

| CRC byte (only for data frames) | Frame Tag | End of Frame | Post frame clock edges | IDLE |
|---|---|---|---|---|
| 8 bits | 4 bits | 0110 | 4 clock edges | |

Table 10 below illustrates an example DATA frame with a user-defined data field length.

TABLE 10

Example User-Defined Length DATA Frame

| IDLE state | Preamble | Start of Frame | Frame Type | User defined data | Data words |
|---|---|---|---|---|---|
| 4 clock edges | 1001 | 0011 | 8 bits | User-defined length-Word 0 transmitted first | |

| CRC byte (only for data frames) | Frame Tag | End of Frame | Post frame clock edges | IDLE |
|---|---|---|---|---|
| 8 bits | 4 bits | 0110 | 4 clock edges | |

Table 11 below shows how data bits are transmitted via a 2-port configuration (e.g., transmission via two data signals 108 and 202. As illustrated in Table 11 below, the Start-of-Frame field, the TYPE field, the TAG field, and the End-of-Field bits are each transmitted identically in both of the data signals 108, 202. The user data field, the data words in the data field, and the CRC bits are split between the two data signals 108, 202. In the illustrated example, the most significant bit is transmitted via the primary data signal 108, and the data signals 108, 202 interleave alternate bits as shown in the Table 11 below.

In the example of Table 11 below, 8 example bits in the user data field are depicted as u7u6u5u4u3u2u1u0, 8 example bits in the CRC field are depicted as c7c6c5c4c3c2c1c0, and 16 bits of data in the data field are depicted as d15d14d13 . . . d0. The IDLE states are omitted from the example Table 11.

TABLE 11

Example Transmission of a 1-Word DATA Frame via Multiple Data Signals

| DATA0 | 1001 | 0011 | u7 u5 u3 u1 | d15 d13 . . . d1 | c7 c5 c3 c1 | TAG | 0110 |
|---|---|---|---|---|---|---|---|
| DATA1 | 1001 | 0011 | u6 u4 u2 u0 | d14 d12 . . . d0 | c6 c4 c2 c0 | TAG | 0110 |

Figure 5:
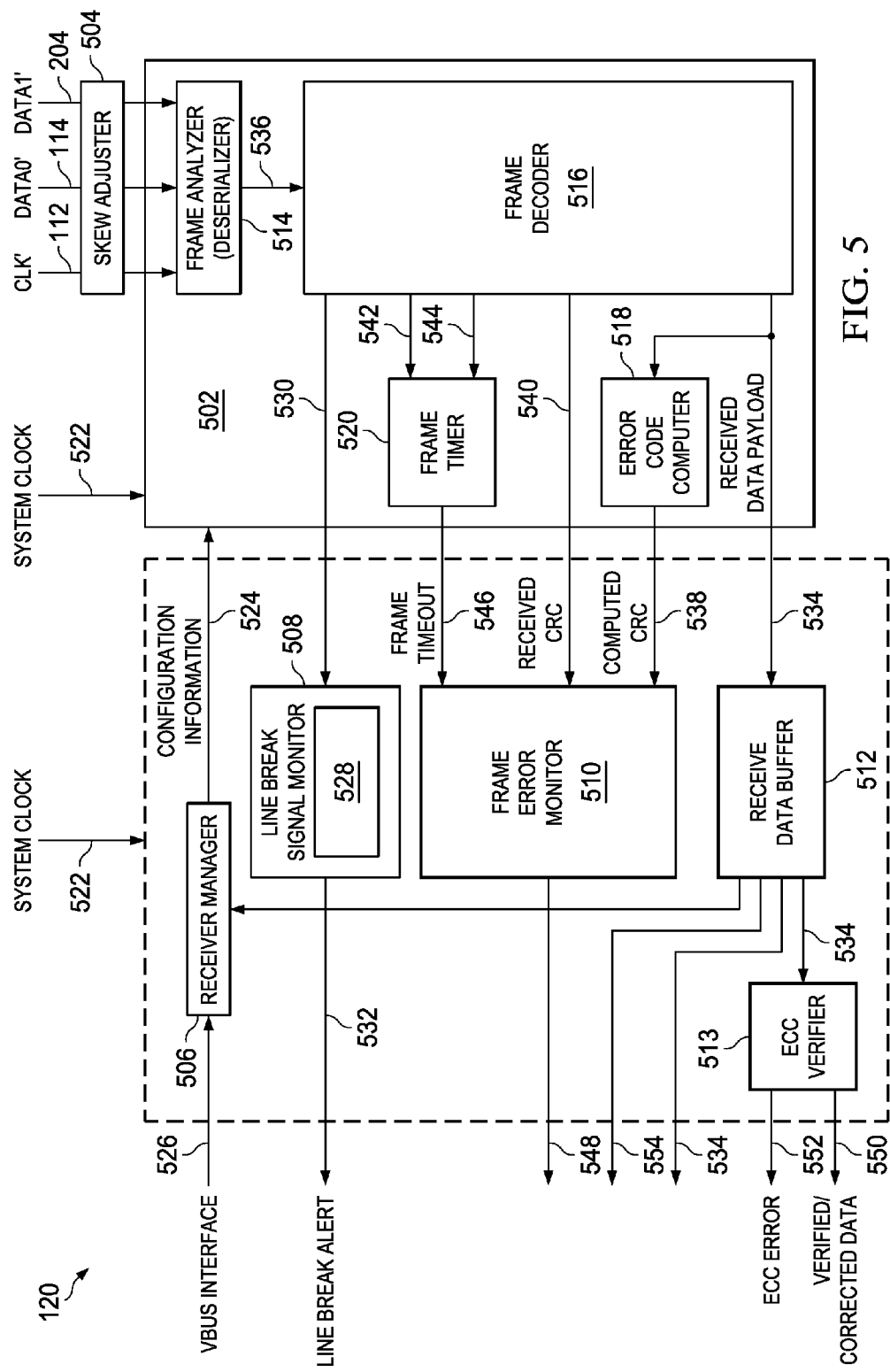
FIG. 5 is an example implementation of the fast serial interface receiver(s) of any of FIGS. 1, 2, and/or 3.

FIG. 5 is an example implementation of the FSI receiver(s) 120 of any of FIGS. 1, 2, and/or 3. The example FSI receiver 120 of FIG. 5 receives the example clock signal 112 (e.g., corresponding to the clock signal 106 transmitted by the FSI transmitter 116 of FIGS. 1, 2, and/or 4), the example first data signal 114 (e.g., corresponding to the first data signal 108 transmitted by the FSI transmitter 116), and the example second data signal 204 (e.g., corresponding to the second data signal 204).

The example FSI receiver 120 of FIG. 5 includes a receiver core 502, a skew adjuster 504, a receiver manager 506, a line break signal monitor 508, a frame error monitor 510, a receive data buffer 512, and an ECC verifier 513.

The example receiver core 502 of FIG. 5 processes the data framing, error code (e.g., CRC) computation, and frame related error checking. The example receiver core 502 includes a frame analyzer 514, a frame decoder 516, an error code computer 518, and a frame timer 520. The example receiver core 502 of FIG. 5 executes using the clock signal 112 as a clock source. The clock signal 112 may be asynchronous to a system clock signal 522 used to run the receiver manager 506, the line break signal monitor 508, the frame error monitor 510, the receive data buffer 512, and/or the ECC verifier 513. In some examples, the clock signal 112 has a frequency less than or equal to the frequency of the system clock signal 522.

The example receiver core 502 receives the FSI clock signal 112 and the data signal(s) 114, 204 after the signals 112, 114, 204 are passed through the skew adjuster 504. The example skew adjuster 504 operates as a configurable delay line for one or more of the signals 112, 114, 204. An example implementation of the skew adjuster 504 is described below with reference to FIG. 8.

The example receiver core 502 may be configured via the receiver manager 506 to, for example, specify a length of a user-defined length data frame type, an error code computation method, and/or an interrupt actions in response to receiving frames. In some examples, the receiver manager 506 is implemented using a set of configurable registers that are accessible by a processor or other circuit to program, control, and/or monitor the operation of the FSI receiver 120 to provide configuration information 524. In some examples, the receiver manager 506 may receive the configuration information 524 via a VBUS interface 526.

The example line break signal monitor 508 of FIG. 5 includes a watchdog timer 528 to detect potential transmission line breaks and to generate alerts in response to such detections. The line break signal monitor 508 receives notifications 530 from the frame decoder 516 when the frame decoder 516 identifies PING packets (and, in some examples, any other packet). The example line break signal monitor 508 runs the watchdog timer 528, which is configured to count using the system clock signal 522. If the watchdog timer 528 counts to a designated value, the example line break signal monitor 508 issues an alert or flag 532 indicating that a line break signal has not been received within an expected time. The example line break signal monitor 508 resets the watchdog timer when a PING frame is received. In some examples, the line break signal monitor 508 may be configured to reset the watchdog timer 528 in response to any frame, instead of only PING frames.

The example receive data buffer 512 receives data payloads 534 extracted by the frame decoder 516 when the frame type is a DATA frame (e.g., as opposed to a PING frame or an ERROR frame). Data stored in the example receive data buffer 512 is accessible by, for example, direct memory access, polling, the VBUS interface 526, and/or any other software and/or hardware-defined interface methods.

The example frame analyzer 514 of FIG. 5 extracts a data frame from the received data signal(s) 114, 204 based on reading data from the received data signal(s) 114, 204 in response to first digital signal edges in the received clock signal 112. In some examples, the frame analyzer 514 recognizes pulses on the clock signal 112 and deserializes the bits received via the received data signal(s) 114, 204. The frame analyzer 514 may implement a state machine to, when data is detected on both of the received data signal(s) 114, 204 (instead of just the primary data signal 114), merge the data into frame data 536. The example frame analyzer 514 provides frame data 536 to the frame decoder 516. In some examples, the frame analyzer 514 outputs the frame data 536 on a bitwise basis to the frame decoder 516, instead of outputting the entire received frame at once.

The example frame analyzer 514 extracts the data from the data signal(s) 114, 204 based on a double data rate transfer method, in which a bit is read from the data signal(s) 114, 204 in response to each edge of the received clock signal 112.

The example frame decoder 516 of FIG. 5 decodes the frame data 536 to identify the data fields in the frame data 536 and extract the data from the data fields. For example, the frame decoder 516 determines the frame type code from the frame type field, and processes the frame data based on the frame type code. For example, when the frame type is a data frame the example frame decoder 516 extracts the data payload 534 from the data field (e.g., based on the length of the data field determined using the frame type code) and outputs the data payload 534 to the received data buffer 512. In some examples, the example data payload 534 may also include data from the user data field (e.g., to assist with error detection and/or correction).

The example error code computer 518 of FIG. 5 calculates an error code based on the received data payload 534. In the example of FIG. 5, the error code computer 518 calculates a CRC code using a same method used by the example FSI transmitter 116 (e.g., the data integrity check generator 424). The example error code computer 518 outputs a computed error code 538 to the frame error monitor 510. The example frame decoder 516 also outputs a received error code 540 that is included in the frame data 536.

The example frame timer 520 automatically detects error conditions resulting from the frame exceeding an expected duration for reception of the frame to complete. When the frame decoder 516 detects a frame reception, such as detecting a valid Start-of-Frame field from the frame analyzer 514, the frame decoder 516 outputs a frame start signal 542 to the frame timer 520. In response to the frame start signal 542, the example frame timer 520 begins counting (e.g., using the system clock as a timing source). If there are no errors in transmission of the frame, then the frame should be received within a stipulated time duration that is less than a trigger value of the frame timer 520. If the frame is received within the designated time period (e.g., detected by the frame decoder 516 identifying a valid End-of-Frame field or pattern), the example frame decoder 516 outputs a frame end signal 544 to the frame timer 520, which causes the frame timer 520 to stop counting and/or resets the frame timer 520. Conversely, if the frame decoder 516 does not detect completion of the frame before the frame timer 520 reaches a threshold count (e.g., a specified number of system clock cycles), the example frame timer 520 generates a frame timeout signal 546, which can be polled by software and/or used to generate an interrupt. The example frame timer 520 outputs the frame timeout signal 546 to the frame error monitor 510.

The example frame error monitor 510 determine whether there are data frame errors based on the computed error code 538, the received error code 540, and/or the frame timeout 546 signals. For example, if the computed error code 538 does not match the received error code 540, the example frame error monitor 510 identifies a data error in the data frame and outputs a frame error signal 548. Additionally or alternatively, if the frame timeout signal 546 is received at the frame error monitor 510 from the frame timer 520, the example frame error monitor 510 determines that there is a frame error and outputs the frame error signal 548.

The example ECC verifier 513 evaluates the received data 534 to determine whether the data is valid, based on an error correction code transmitted in the data by the FSI transmitter 116. The example ECC verifier 513 takes received data as an input from the received data buffer 512. The example ECC verifier 513 is independent of the line break signal monitor 508. In some examples, the ECC verifier 513 receives the data from the user data field as an error correction code for verifying that the received data is correct and/or reliable.

For example, the ECC verifier 513 verifies that the received data corresponds to the data from the user data field based on an error correction code calculation of the received data. If the ECC verifier 513 identifies a correctable error in the received data or if there was no error in the received data, then the ECC verifier 513 outputs the verified or corrected data 550. If the ECC verifier 513 identifies an uncorrectable error, then the ECC verifier 513 may output an error signal or flag 552 that the verified or corrected data 550 should be treated as unreliable.

When received data is available (e.g., stored) in the receive data buffer 512, the example receive data buffer 512 may issue an interrupt 554 to a processor or other consumer of the received data. In some other examples, the receive data buffer 512 may be polled or otherwise accessed for the received data. For example, a processor executing software and/or another data consuming circuit may access the received data buffer 512 via the VBUS interface 526 to access the stored data.

Figure 6:
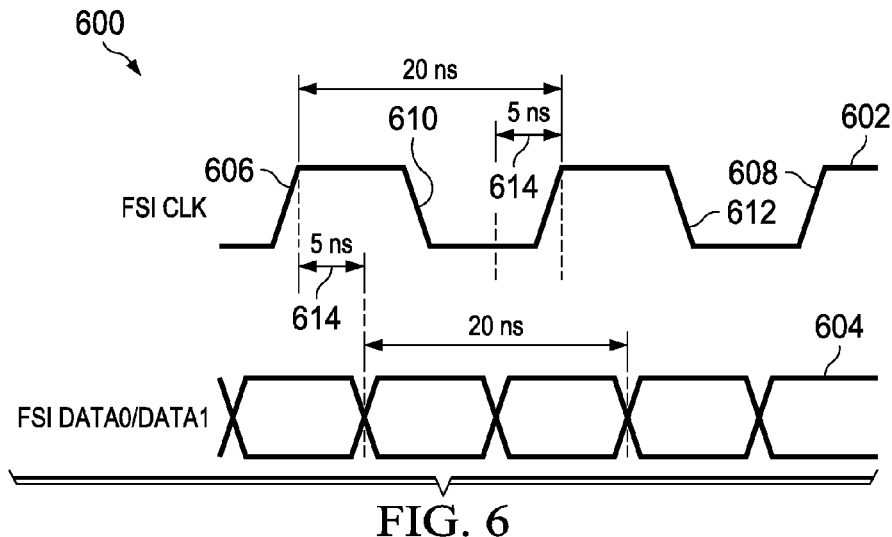
FIG. 6 is a timing diagram illustrating an example digital clock signal and an example data transmission signal that may be output by the example fast serial interface transmitter of FIG. 4.

FIG. 6 is a timing diagram 600 illustrating an example digital clock signal 602 and an example data signal 604 that may be output by the example FSI transmitter 116 of FIG. 4. As mentioned above with reference to FIGS. 4 and 5, data is transmitted via the data signal(s) 604 at both the rising edges 606, 608 and falling edges 610, 612 of the clock signal 602. At a 50 MHz frequency for the clock signal 602, there is a period of approximately 20 nanoseconds (20 ns) between adjacent rising edges (or adjacent falling edges). The example data signal 604 has a 5 ns guard or hold times 614 between the edges 606-612 of the clock signal 602 and any transitions at the example data signal 604.

Figure 7:
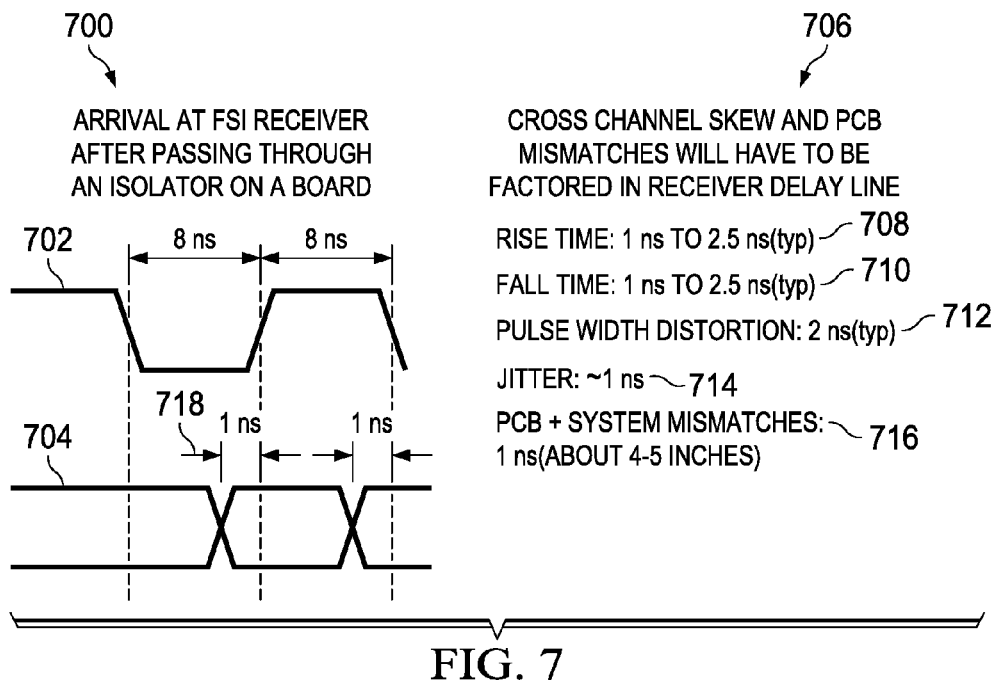
FIG. 7 is a timing diagram illustrating an example digital clock signal and an example data transmission signal that may be received at the example fast serial interface receiver of FIG. 5 based on the example digital clock signal and the example data transmission signal of FIG. 6.

FIG. 7 is a timing diagram 700 illustrating an example digital clock signal 702 and an example data signal 704 that may be received at the example FSI receiver 120 of FIG. 5 based on the example digital clock signal 602 and the example data signal 604 of FIG. 6. The example digital clock signal 702 and the example data signal 704 may represent the digital clock signal 602 and the data signal 604 of FIG. 6 after having passed through a conventional isolation device (e.g., the isolation device 110 of FIG. 1).

Example characteristics 706 of the conventional isolation device are shown in FIG. 7. For example, the conventional isolation device may have a signal rise time 708 between 1 ns and 2.5 ns, a fall time 710 between 1 ns and 2.5 ns, a pulse width distortion 712 of about 2 ns, a jitter 714 of about 1 ns, and/or system mismatches 716 (e.g., signal trace distance mismatches in a printed circuit board, and/or other differences in signal travel) of about 1 ns.

As a result of the isolation device, having the example characteristics 706, relaying the digital clock signal 702 and the example data signal 704, the digital clock signal 702 and/or the data signal 704 experience cross-channel skew, circuit timing mismatches, delays, and/or other effects that are accounted for by the FSI receiver (e.g., at the frame skew adjuster 504 and/or by the frame analyzer 514). For example, in FIG. 7, the clock signal may have shorter times between edges than in the clock signal 602, longer rise and/or fall times than the clock signal 602, and/or other signal distortions. To compensate, the example skew adjuster 504 may apply a delay to the clock signal 702 and/or to the data signal 704. Additionally or alternatively, the frame analyzer 514 may use a different guard time 718 to read the data signal 704 based on the clock signal 702 than the guard times 614 of FIG. 6.

Figure 8:
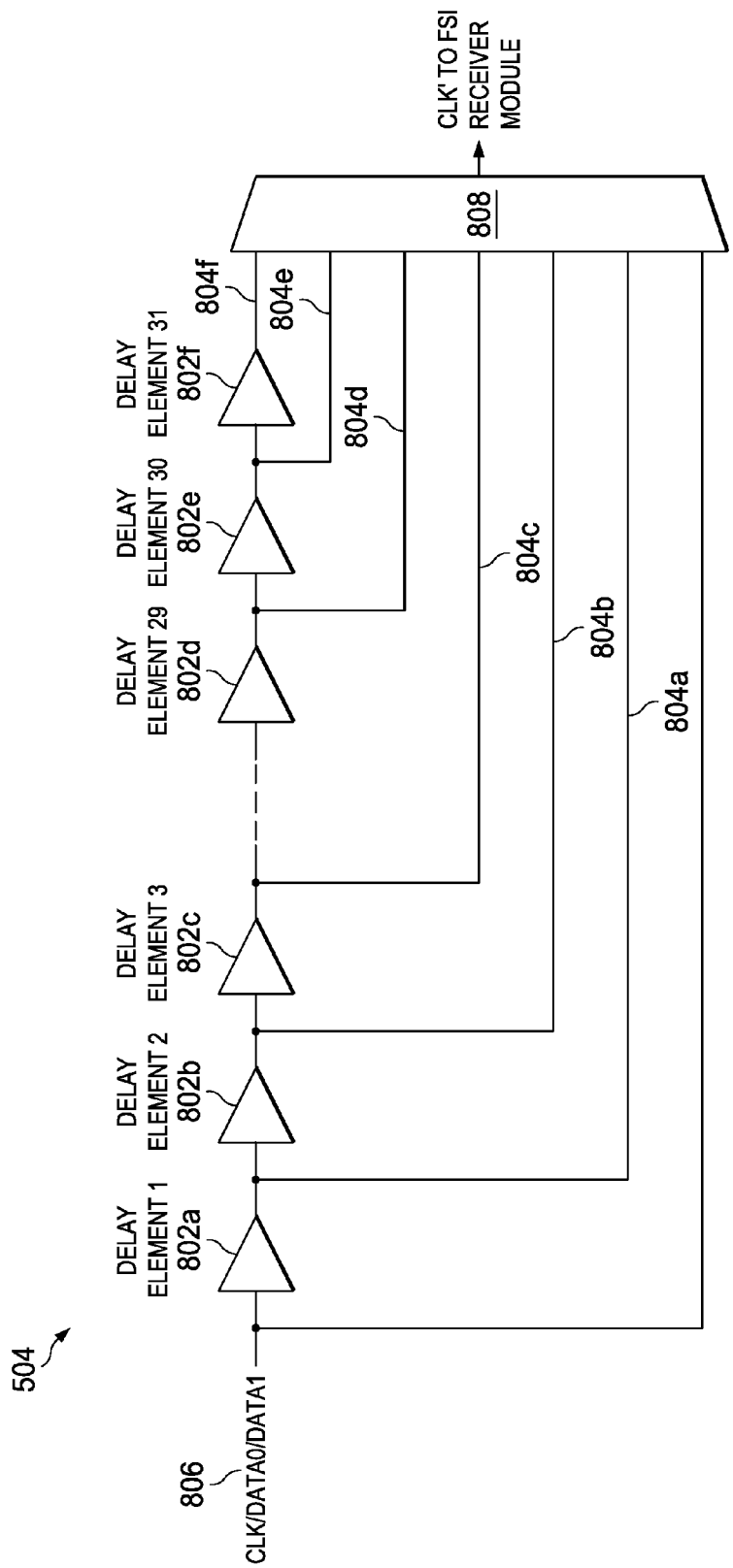
FIG. 8 is an example implementation of the skew adjuster of FIG. 5.

FIG. 8 is an example implementation of the skew adjuster 504 of FIG. 5. The example skew adjuster 504 includes multiple delay elements 802a-802f configured in series. While six delay elements 802a-802f are illustrated in FIG. 8, the example skew adjuster 504 may be provided with any number of the delay elements 802a-802f to provide as much delay as may be desired for an application. The example skew adjuster 504 receives an input signal (e.g., the clock signal 112, the data signal 114, or the data signal 204 of FIGS. 2 and/or 5). Each of the example delay elements 802a-802f may have its delayed output signal 804a-804f tapped as an input to a multiplexer 806. As a result, the multiplexer 806 is provided with the same input signal at multiple levels of delay.

The example multiplexer 806 takes a delay configuration signal 808 as an input and outputs one of the output signals 804a-804f as a delayed output 810. The example skew adjuster 504 shown in FIG. 8 may be duplicated for additional one(s) of the received signals 112, 114, 204, and independently configured to have different delay(s) for the different signals 112, 114, 204.

The example delay elements 802a-802f of FIG. 8 are, for example, process, voltage, and temperature compensated delay buffers. As a result, selection of different ones of the delayed output signal 804a-804f results in linear increments and/or decrements of the delays in the signal path.

FIG. 9 is a signal diagram 900 illustrating an example of operation of the FSI transmitter 116 of FIG. 4 transmitting a frame of data via a single unidirectional port (e.g., the data signal 108 of FIG. 4). The example signal diagram 900 includes the clock signal 106 and the primary data signal 108.

During a first time period 902 prior to transmission of the data frame, both of the example clock signal 106 and the example data signal 108 are held at a high signal level (e.g., to a voltage representing a logical one) to conserve energy that would otherwise be consumed by switching at least the clock signal 106. When the frame transmission is triggered at the transmitter core 402, the example clock signal 108 is switched during a preamble phase 904 including 4 clock edges while the data signal 108 is held at a high signal level.

After the preamble phase 904, the example data signal 108 begins transmitting a bit on each edge of the clock signal 106, starting with the most significant bit of the Start-of-Frame field (e.g., 1001). The example data signal 108 proceeds with the remaining data in the frame, and ends with four post frame clock edges 906 while the data signal 108 is again held at a high signal level.

FIG. 10 is a signal diagram 1000 illustrating an example of operation of the FSI transmitter 116 of FIG. 4 transmitting a PING packet (e.g., a transmission line check packet) via multiple unidirectional data signals. The signal diagram 1000 of FIG. 10 includes the clock signal 106, the primary data signal 108, and the second data signal 202. As described above, an example PING packet has a type field of 0000.

Prior to transmission of the PING packet, the clock signal 106 and the data signals 108, 202 are held at a high signal level. The example packet transmission begins with a preamble 1002 of four edges of the clock signal 106 while the data signals 108, 202 are held at a high signal level. After the preamble 1002, the example data signals 108, 202 are controlled to transmit a Start-of-Frame field 1004 (e.g., a bit sequence of 1-0-0-1).

After the Start-of-Frame field 1004, a frame type field 1006 is transmitted. As described above, the PING frame type field corresponds to a bit sequence of 0-0-0-0. A tag field 1008 is a user-defined or software-defined field. In the example of FIG. 10, the tag field 1008 is a bit sequence of 0-0-0-1. Unlike a data frame, the example PING frame is transmitted using the same data on both of the data signals 108, 202.

The example PING frame ends with an End-of-Frame field 1010 (e.g., the bit sequence 0-1-1-0) and 4 post-frame edges 1012 on the clock signal 106 while the data signals 108, 202 are held at a high signal level. After completing the frame, the example FSI transmitter may transmit additional frames (e.g., a data frame) and/or disable the clock signal 106 until the next frame transmission (e.g., to conserve energy).

While an example manner of implementing the example FSI transmitter 116 and the example FSI receiver 120 of FIGS. 1, 2, and/or 3 are illustrated in FIGS. 4 and 5, one or more of the elements, processes and/or devices illustrated in FIGS. 4 and 5 may be combined, divided, re-arranged, omitted, eliminated and/or implemented in any other way. Any of the example transmitter core 402, the example transmit clock signal generator 404, the example transmit data buffer 406, the example error correction code generator 408, the example line break signal generator 410, the example transmitter manager 412, the example transmission arbitrator 418, the example signal framer 420, the example clock signal controller 422, the example data integrity check generator 424, the example transmission controller 426, the example receiver core 502, the example skew adjuster 504, the example receiver manager 506, the example line break signal monitor 508, the example frame error monitor 510, the example receive data buffer 512, the example ECC verifier 513, the example frame analyzer 514, the example frame decoder 516, the example error code computer 518, the example frame timer 520 and/or, more generally, the example FSI transmitter 116 and/or the FSI receiver 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transmitter core 402, the example transmit clock signal generator 404, the example transmit data buffer 406, the example error correction code generator 408, the example line break signal generator 410, the example transmitter manager 412, the example transmission arbitrator 418, the example signal framer 420, the example clock signal controller 422, the example data integrity check generator 424, the example transmission controller 426, the example receiver core 502, the example skew adjuster 504, the example receiver manager 506, the example line break signal monitor 508, the example frame error monitor 510, the example receive data buffer 512, the example ECC verifier 513, the example frame analyzer 514, the example frame decoder 516, the example error code computer 518, and/or the example frame timer 520 is/are hereby expressly defined to include a tangible computer readable storage device or storage disk such as a memory, a digital versatile disk (DVD), a compact disk (CD), a Blu-ray disk, etc.

storing the software and/or firmware. Further still, the example FSI transmitter 116 and/or the FSI receiver 118 of FIGS. 1, 2, 3, 4, and/or 5 may include one or more elements, processes and/or devices in addition to, or instead of, those illustrated in FIGS. 1, 2, 3, 4, and/or 5, and/or may include more than one of any or all of the illustrated elements, processes and devices.

It is noted that this patent claims priority from U.S. Provisional Patent Application Ser. No. 62/199,006, which was filed on Jul. 30, 2015, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A serial data transmitter, comprising:
    a clock signal generator to generate a digital clock signal at a clock signal port when the clock signal generator is enabled;
    a clock signal controller to enable the clock signal generator during first times when data is to be transmitted via a unidirectional transmission port and to disable the clock signal generator during second times when there is no data to be transmitted;
    a line break signal generator to, in response to an expiration of a time period, trigger the transmission of a transmission line check frame;
    a data integrity check generator to generate error detection data corresponding to first data to be transmitted via the transmission port;
    a signal framer to:
       in response to receiving the first data and an indication that the first data is to be transmitted via the transmission port, generate a first data frame having a preamble, second data indicating a start of the first data frame, third data indicating that the first data frame contains user data, the first data, the error detection data, and fourth data indicating an end of the first data frame; and
       generate the transmission line check frame for serial transmission via the transmission port.

2. The serial data transmitter as disclosed in claim 1, further including a transmission controller to:
    send a transmission signal to the clock signal controller when the first data frame is to be transmitted;
    transmit the first data frame via the transmission port using double data rate transmission based on the digital clock signal;
    send a non-transmission signal to the clock signal controller when the first data frame has been transmitted;
    send the transmission signal to the clock signal controller when the transmission line check frame is to be transmitted;
    transmit the transmission line check frame via the transmission port using double data rate transmission based on the digital clock signal; and
    send the non-transmission signal to the clock signal controller when the transmission line check frame has been transmitted.

3. The serial data transmitter as disclosed in claim 2, further including a processor to execute first instructions, the transmission controller to send the transmission signal to the clock signal controller and transmit the first data frame via the transmission port in response to a trigger signal from the processor.

4. The serial data transmitter as disclosed in claim 1, wherein the transmission controller is to transmit a first portion of the first data frame via the transmission port and transmit a second portion of the first data frame via a second transmission port.

5. The serial data transmitter as disclosed in claim 1, wherein the signal framer is to generate the first data frame to include a start-of-frame field including a designated first bit sequence, a frame type field including a second bit sequence, a first data field including a third bit sequence, a second data field including the first data, a data integrity field including the error detection data, a frame tag field including a fourth bit sequence, and an end-of-frame field including a designated fifth bit sequence.

6. The serial data transmitter as disclosed in claim 5, wherein the signal framer is to set the second bit sequence based on a length of the fourth bit sequence.

7. The serial data transmitter as disclosed in claim 4, further including an error correction code generator to generate an error correction code based on the first data, the third bit sequence including the error correction code.

8. The serial data transmitter as disclosed in claim 1, wherein the signal framer is to generate the transmission line check frame to include a start-of-frame field including a first bit sequence, a frame type field including a second bit sequence, a frame tag field including a third bit sequence, and an end-of-frame field including a fourth bit sequence.

9. The serial data transmitter as disclosed in claim 1, further including a transmission arbitrator to:
    receive the indication that the first data is to be transmitted;
    receive the trigger for the transmission line check frame; and
    indicate that the signal framer is to generate the first data frame based on arbitrating between the first data and the transmission line check frame.

10. A serial data receiver, comprising:
    a skew adjuster to apply a delay to at least one of a received clock signal or a received data signal to adjust a delay between the received clock signal and the received data signal;
    a frame analyzer to extract a data frame from the received data signal based on reading data from the received data signal in response to first digital signal edges in the received clock signal, the data frame including a set of data fields, the frame analyzer to extract the data frame by reading data according to a double data rate transfer;
    a frame decoder to extract a frame type from the set of data fields and, when the frame type is the data frame, to extract a data payload from the set of data fields;
    a line break signal monitor to:
       when the frame type is a transmission line check frame, reset a transmission line break watchdog timer; and
       when the watchdog timer satisfies a threshold value, trigger a transmission line break signal;
    a frame error monitor to determine whether a first data error check code calculated based on the set of data fields matches a second data error check code included in the set of data fields; and
    a data buffer to store the data payload when the first data error check code matches the second data error check code.

11. The serial data receiver as disclosed in claim 10, further including a frame timer to receive a frame start signal in response to the frame decoder identifying a valid start of frame field in the set of data fields and, when a frame end signal is not received from the frame decoder within a threshold time, to generate a frame timeout signal.

12. The serial data receiver as disclosed in claim 10, further including an error code computer to calculate a computed error code based on the data payload, the frame error monitor to compare the computed error code with a received error code extracted by the frame decoder from the set of data fields, the frame error monitor to generate a frame error signal when the computed error code does not match the received error code.

13. The serial data receiver as disclosed in claim 10, further including a processor to execute an instruction based on the data payload, the data buffer to output the data payload to the processor in response to a request by the processor based on the instruction.

14. The serial data receiver as disclosed in claim 10, wherein the frame decoder is to:
decode a start-of-frame field including a designated first bit sequence from the set of data fields;
decode a frame type field including a second bit sequence from the set of data fields;
based on identifying the second bit sequence, decode a first data field including a third bit sequence from the set of data fields and decode a second data field including the data payload from the set of data fields;
decode a data integrity field including the second data error check code from the set of data fields;
decode a frame tag field including a fourth bit sequence from the set of data fields; and
decode an end-of-frame field including a designated fifth bit sequence.

15. The serial data receiver as disclosed in claim 10, wherein the skew adjuster includes a plurality of delay elements connected in series, corresponding outputs of the delay elements having different amounts of delay relative to the received clock signal or the received data signal, the outputs being selectable to apply one of the amounts of delay to apply the delay.

16. The serial data receiver as disclosed in claim 10, wherein the frame analyzer is to deserialize the received data signal and is to output the data frame bitwise to the frame decoder.

17. The serial data receiver as disclosed in claim 10, further including an error correction code verifier to:
receive the data payload and a received error correction code extracted by the frame decoder from the set of data fields;
calculate a computed error correction code based on the data payload;
compare the computed error correction code to the received error correction code; and
when the comparison indicates that the data payload includes an uncorrectable error, output an indication that the data payload is not reliable.

18. A serial communications device, comprising:
a clock signal generator to output a first digital clock signal;
a clock signal controller to output a clock enable signal;
a data integrity check generator to:
receive first data as an input;
calculate error detection data based on the first data; and
output the error detection data;
a signal framer having the first data as an input, a frame transmission signal as an input, and the error detection data as an input, the signal framer to output a first data frame, the first data frame including a start-of-frame field including a designated first bit sequence, a frame type field including a second bit sequence, a first data field including a third bit sequence, a second data field including the first data, a data integrity field including the error detection data, a frame tag field including a fourth bit sequence, and an end-of-frame field including a designated fifth bit sequence;
a transmission controller to receive the first digital clock signal as an input and to receive the first data frame as an input, and to output the first digital clock signal via a first port and output the first data frame via a second port based on a double date rate transmission with reference to the first digital clock signal;
a skew adjuster to receive a second digital clock signal as an input and receive a second data signal as an input, to apply a delay to at least one of the second digital clock signal or the second data signal, and to output the second digital clock signal and the second data signal based on the delay;
a frame analyzer to receive the second digital clock signal at a third port and receive the second data signal at a fourth port, and to output a second data frame received in the second data signal;
a frame decoder to:
receive the second data frame as an input;
extract a frame type from the second data frame;
when the frame type is a data frame, to extract second data from the second data frame; and
output the second data.

19. The serial communications device as disclosed in claim 18, further including a line break signal generator to, in response to an expiration of a time period, output a transmission line check request, the signal framer to generate a second data frame based on the transmission line check request.

20. The serial communications device as disclosed in claim 18, wherein the frame decoder is to:
decode the start-of-frame field including the designated first bit sequence from the second data frame;
decode the frame type field including a sixth bit sequence from the second data frame;
based on identifying the sixth bit sequence, decode a third data field including a seventh bit sequence from the second data frame and decode a fourth data field including the second data from the second data frame;
decode the data integrity field from the second data frame;
decode the frame tag field including an eighth bit sequence from the second data frame; and
decode the end-of-frame field including the designated fifth bit sequence.

* * * * *